US012551851B2

(12) United States Patent
Benedek

(10) Patent No.: US 12,551,851 B2
(45) Date of Patent: Feb. 17, 2026

(54) OPERATION OF IMMERSED MEMBRANE USING CROSS FLOW

(71) Applicant: FIBRACAST LTD., Hannon (CA)

(72) Inventor: Diana Benedek, Rancho Santa Fe, CA (US)

(73) Assignee: FIBRACAST LTD., Hannon (CA)

( * ) Notice: Subject to any disclaimer, the term of this patent is extended or adjusted under 35 U.S.C. 154(b) by 351 days.

(21) Appl. No.: 18/027,334

(22) PCT Filed: Oct. 4, 2021

(86) PCT No.: PCT/CA2021/051384
§ 371 (c)(1),
(2) Date: Mar. 20, 2023

(87) PCT Pub. No.: WO2022/073106
PCT Pub. Date: Apr. 14, 2022

(65) Prior Publication Data
US 2023/0372877 A1 Nov. 23, 2023

Related U.S. Application Data

(60) Provisional application No. 63/087,803, filed on Oct. 5, 2020.

(51) Int. Cl.
*B01D 63/08* (2006.01)
*B01D 65/08* (2006.01)
*C02F 3/12* (2023.01)

(52) U.S. Cl.
CPC ......... *B01D 65/08* (2013.01); *B01D 63/0821* (2022.08); *C02F 3/1273* (2013.01);
(Continued)

(58) Field of Classification Search
CPC ............... B01D 65/08; B01D 2315/06; B01D 2315/10; C02F 3/1273; C02F 2301/046
See application file for complete search history.

(56) References Cited

U.S. PATENT DOCUMENTS 7,025,885 B2 4/2006 Cote et al.
7,122,121 B1 10/2006 Ji
(Continued)

FOREIGN PATENT DOCUMENTS

CN 1735452 A 2/2006
CN 101795754 A 8/2010
(Continued)

OTHER PUBLICATIONS

International Patent Application No. PCT/CA2021/051384, International Preliminary Report on Patentability, dated Apr. 20, 2023.
(Continued)

*Primary Examiner* — Bradley R Spies
(74) *Attorney, Agent, or Firm* — BORDEN LADNER GERVAIS LLP; Michael Damiani

(57) ABSTRACT

A method of operating an immersed membrane filtration system includes a step of providing a liquid flow, for example a recirculation flow, past the surface of the membranes to clean, or help clean, the membrane surface. Since immersed outside-in membranes are effectively filtering out clean water from the effluent, they are also dewatering the effluent. To avoid solids concentration, most immersed membrane systems require that a certain amount of effluent liquid is recirculated back to an area upstream of the membranes. This is called a recirculation flow in general and is, for example, associated with the flow of return activated sludge (RAS) in a membrane bioreactor (MBR). In systems and methods described herein, we control a recirculating flow to have enough energy to scour the surface of the membranes, thus combining its use of providing liquid to the membranes and scouring their surfaces.

21 Claims, 16 Drawing Sheets

(52) U.S. Cl.
CPC ...... *B01D 2315/06* (2013.01); *B01D 2315/10* (2013.01); *C02F 2301/046* (2013.01); *C02F 2303/20* (2013.01)

(56) References Cited

U.S. PATENT DOCUMENTS

| | | | |
|---|---|---|---|
| 7,695,624 | B2 | 4/2010 | Brockmann et al. |
| 2006/0081534 | A1 | 4/2006 | Dimitriou et al. |
| 2011/0186513 | A1 | 8/2011 | Vuong et al. |
| 2013/0092621 | A1 | 4/2013 | Tomescu et al. |
| 2015/0129492 | A1 | 5/2015 | Timpany |
| 2016/0200607 | A1* | 7/2016 | Gilron .................. C02F 3/1273 210/151 |
| 2017/0088449 | A1 | 3/2017 | Cote et al. |

FOREIGN PATENT DOCUMENTS

| | | |
|---|---|---|
| JP | H05285480 A | 11/1993 |
| JP | 2001062480 A | 3/2001 |
| JP | 2013534458 A | 9/2013 |
| WO | 2008038436 A1 | 4/2008 |
| WO | 2011097403 A1 | 8/2011 |
| WO | 2011130853 A1 | 10/2011 |
| WO | 2020006628 A1 | 1/2020 |
| WO | 2021007646 A1 | 1/2021 |

OTHER PUBLICATIONS

International Patent Application No. PCT/CA2021/051384, International Search Report and Written Opinion dated Dec. 29, 2021.
Chinese Patent Application No. CN202180068142.X Office Action dated Jul. 1, 2025—English Translation Available.
Japanese Patent Application No. 2023-520520, Office Action dated Jun. 10, 2025—English Translation Available.
European Patent Application No. 21876795.2, Extended European Search Report dated Sep. 20, 2024.

* cited by examiner

A RF v. Permeability

Train 2, no aeration

|  | RF (Q) | Permeability |
|---|---|---|
| 22 GFD | 1 | 12 |
|  | 2 | 12.6 |
|  | 4 | 13.3 |
| 30 GFD | 3 | 12.6 |
|  | 4 | 13.6 |
|  | 5 | 13.7 |

C Aeration v. Permeability

Train 1-2, 3-4 Q-RF

|  | Aeration | Permeability |
|---|---|---|
| Train 1 - 22 GFD | 0.003 | 9.6 |
|  | 0.006 | 9.8 |
|  | 0.012 | 9.5 |
| Train 2 - 40 GFD | 0 | 13 |
|  | 0.003 | 12.7 |

A

B

OPERATION OF IMMERSED MEMBRANE USING CROSS FLOW

FIELD

This invention relates to immersed membrane filters and methods of operating them.

BACKGROUND

The following paragraphs are not an admission that anything discussed in them is prior art or part of the knowledge of persons skilled in the art.

Immersed membranes are typically in the form of flat sheets or hollow fibers. Typical applications include filtering surface water to produce drinking water and treating wastewater in a membrane bioreactor (MBR). In these applications, the membranes usually have pores in the microfiltration or ultrafiltration range. Some examples of hollow fiber modules are described in U.S. Pat. No. 5,639,373. Some examples of flat sheet modules are described in U.S. Pat. No. 6,287,467. In use, a module containing many membranes is immersed in an open tank of liquid to be filtered. Permeate is withdrawn by gravity, siphon or permeate pump connected to an inner surface of the membranes.

Immersed membranes, like most membrane systems, are prone to fouling of the membrane pores. Further, when filtering liquid with a high concentration of suspended solids, such as mixed liquor, pockets of dewatered sludge can form in parts of the membrane module. While fouling is local to the pores of a membrane, sludging is a much larger accumulation of solids spanning between multiple membranes in a module and interfering with the flow of fresh feed liquid into parts of the module. Areas of sludging can be, for example, more than 10 cm wide in at least one direction. Air bubbles are often provided below immersed modules to help inhibit fouling and sludging. However, sludging can still occur, particularly when process conditions change in a membrane bioreactor. Areas of significant sludging can expand over time despite continued aeration until the membrane module is removed from the tank for physical de-sludging.

International Publication Number WO 2017/049408 A1, Method of Operating Membrane Filter, describes an immersed flat sheet membrane having an undulating surface. The membranes can be assembled together into modules, blocks and cassettes. Various methods of operating the membranes including aeration to inhibit fouling or sludging are described.

International Publication Number WO 2020/006628 A1, Tightly Spaced Flat Sheet Immersed Membranes and Fine Bubble Aeration, describes using fine bubbles to maintain permeability of closely spaced membranes.

INTRODUCTION

This summary is intended to introduce the reader to the invention and the detailed description to follow but not to limit or define the claimed invention.

Membrane systems require that the outer surface of the membranes be cleaned such that solids are continually removed away from the outer surface of the membranes allowing for essentially continuous filtration. Immersed membrane systems typically use air bubbles as the main mechanism to scour the membrane surface in an attempt to remove debris and foulants. To be effective, air needs to be injected near the lowest part of the modules. A blower must push air through an aerator against the hydraulic pressure created by the weight of water on top of the aerator, which increases with the water submergence depth. The energy required to generate air bubbles at the bottom of the membranes is significant and increases the operation cost of the filtration system.

Since membranes are effectively separating clean water from the feed water, they are also dewatering the effluent that is produced near the outer surface of the membranes. To avoid excessive solids concentration, immersed membrane systems require that a certain amount of liquid flows across the membrane surface so as to maintain a low level of solids in the effluent and reduce its viscosity. In membrane bioreactors (MBR), liquid flow is often provided by recirculating feed liquid through the membrane modules. The rate of flow through the membrane modules can be in an amount that exceeds the initial influent rate (Q). In some applications, such as surface water or tertiary filtration, liquid flow through the membrane modules is related to providing a return flow (RF), alternatively called a recirculating flow, recycling flow, or feed flow, on a system level. When using an activated sludge process, liquid flow through the membrane modules is related to providing return activated sludge (RAS). However, commercially available immersed membrane systems do not use liquid flow as a primary means to keep the membranes clean. Instead, as discussed above, commercially available immersed membranes use air as the primary means to keep the membranes clean.

The inventors have discovered that providing a liquid flow at an appropriate rate and velocity in a cross flow pattern past the surface of a membrane allows the liquid flow to be used as the primary or sole means to keep membrane surfaces clean. The liquid flow can be associated with a recirculated flow as in the return activated sludge (RAS) in membrane bioreactors or can be associated with a feed flow, recycling flow, or return flow (RF) in the treatment of water (i.e. surface water) and tertiary effluent. Collectively, RAS, feed flow, recycling flow, and RF can be called a recirculation flow. The volume and rate of the liquid flow is selected to provide enough shearing of the surface so as to clean the membrane surface. This liquid flow rate and velocity may vary with the liquid viscosity and suspended solids in the liquid. These parameters may influence the Reynolds number necessary to create enough shear and turbulence to scour and clean the membrane surface. Once a liquid flow rate is made sufficient or optimized, the level of aeration that is normally used to scour immersed membranes can be reduced or even eliminated in certain applications. Using a sufficient or optimized liquid flow for: 1) providing liquid to membranes; and 2) scouring their surfaces, may provide a more efficient and/or cost effective filtration system compared to similar systems that use aerators as the primary or supplementary means for souring membrane surfaces.

This specification describes a method in which liquid flow is provided past the surface of the membranes at a cross flow velocity of at least about 0.01 m/s. Optionally, the face-to-face spacing between the membranes is from about 6.0 mm or less. Optionally, the method comprises aerating the membranes at a rate of less than about 0.03 scfm or 0 scfm (i.e. no aeration). Optionally, the liquid flow is directed to the bottom of the membranes. Optionally, the liquid flow is directed upwards through the membranes.

The specification also describes an immersed membrane system having an immersed membrane unit. The system is believed to be particularly suitable for use with the method steps described above. Each membrane unit may have one or more cassettes or other structures containing filtering membranes. Optionally, the face-to-face spacing between the membranes is from about 6.0 mm or less. The system comprises a liquid flow pathway, for example a recirculation flow pathway, configured to provide liquid flow past the surface of the membranes at a cross flow velocity of at least about 0.01 m/s. Optionally, the system comprises an aerator for aerating the membranes at a rate of less than about 0.03 scfm or 0 scfm. Alternatively, the system does not comprise an aerator. In some examples, the system is part of a membrane bioreactor. Optionally, the liquid flow is directed to the bottom of the membranes. Optionally, the liquid flow is directed upwards through the membranes.

In at least some cases, the method and membrane system described herein may reduce the operating cost of an aerated, or more heavily aerated, immersed membrane system. Cleaning is provided or enhanced by using the scouring effect of liquid flowing past the membrane surface instead of the scouring created by air bubbles. The liquid flow is used as the base shearing mechanism to keep membrane surfaces clean, either alone or supplemented by air, or sometimes with air and sometimes without. Air is replaced in totality or partially by liquid flow at an appropriate velocity in a cross flow pattern so as to create shearing at the membrane surface. Without intending to be limited by theory, using a sufficient or optimized liquid flow to clean membranes is believed to reduce the total cost of operation of immersed membranes because it requires less energy to operate a high flow liquid pump than it is to operate a blower that needs to push the air against the elevation head of the liquid in the tank on top of the aerators.

DETAILED DESCRIPTION

Figure 1:
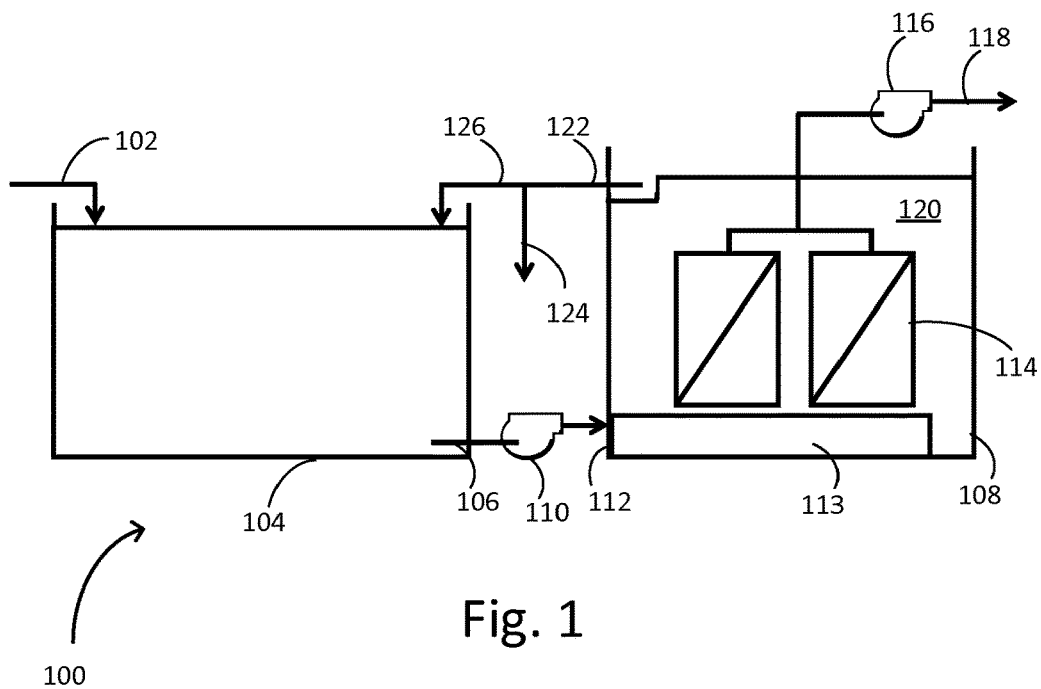
FIG. 1 is a schematic drawing of a membrane bioreactor.

The specification describes a method of operating an immersed membrane system. The method comprises providing a membrane tank having an immersed membrane unit, where the membranes have a face-to-face spacing between the membranes of about 6.0 mm or less; providing a liquid flow past the surface of the membranes, where the liquid flow has a cross flow velocity of at least 0.01 m/s; and aerating the immersed membrane unit at a rate of less than about 0.03 scfm, or 0 scfm.

The specification also describes an immersed membrane system. The system comprises: a membrane tank having an inlet to receive influent and an outlet; a membrane unit within the membrane tank, where the membranes have a face-to-face spacing between the membranes of about 6.0 mm or less; and a pump to provide liquid flow past the surface of the membranes at cross flow velocity of at least 0.01 m/s.

The cross flow velocity (CFV) refers to the linear velocity of liquid flow generally tangential to a membrane surface. The herein described liquid flow CFV may be any velocity that creates a sufficient membrane shearing force that provides the desired cleaning of the membrane, either alone or supplemented by air. Optionally, the CFV may be at least about 0.01 m/s, for example, from about 0.01 m/s to about 2.0 m/s; from about 0.3 m/s to about 0.8 m/s; from about 0.1 m/s to about 1.0 m/s; about 0.01 m/s; about 0.02 m/s; about 0.05 m/s; about 0.1 m/s; about 0.15 m/s; about 0.2 m/s; about 0.25 m/s; about 0.3 m/s; about 0.35 m/s; about 0.4 m/s; about 0.45 m/s; about 0.5 m/s; about 0.6 m/s; about 0.7 m/s; about 0.8 m/s; about 0.9 m/s; about 1.0 m/s; about 1.1 m/s; about 1.2 m/s; about 1.3 m/s; about 1.4 m/s; about 1.5 m/s; about 1.6 m/s; about 1.7 m/s; about 1.8 m/s; about 1.9 m/s; about 2.0 m/s; or from any velocity listed above to any other velocity listed above. Preferably, the CFV is from about 0.1 m/s to about 1.0 m/s, or greater than about 0.2 m/s. Optionally, the CFV is provided with a decreased or eliminated contribution provided by air. The sufficient membrane shearing force produced by the herein described CFV may be an average shear stress on a membrane surface of from about 0.2 Pa to about 5.0 Pa, for example, from about 0.5 Pa to about 3.0 Pa; from about 0.7 Pa to about 2.1 Pa; about 0.5 Pa; about 0.6 Pa; about 0.7 Pa; about 0.8 Pa; about 0.9 Pa; about 1.0 Pa; about 1.1 Pa; about 1.2 Pa; about 1.3 Pa; about 1.4 Pa; about 1.5 Pa; about 1.6 Pa; about 1.7 Pa; about 1.8 Pa; about 1.9 Pa; about 2.0 Pa; about 2.1 Pa; about 2.2 Pa; about 2.3 Pa; about 2.4 Pa; about 2.5 Pa; about 2.6 Pa; about 2.7 Pa; about 2.8 Pa; about 2.9 Pa; about 3.0 Pa; or from any pressure listed above to any other pressure listed above. Preferably, the average shear stress on a membrane surface is from about 0.5 Pa to about 3.0 Pa, or greater than about 1.0 Pa.

The herein described liquid flow CFV may be related to: 1) the recirculation flow rate; 2) the cross-sectional area between the membranes in a membrane unit and/or the cross sectional area between walls of a membrane tank and the front, sides, and back of a membrane unit positioned adjacent to the walls; 3) the level or rate of aeration; 4) the viscosity of the liquid flow and/or suspended solids in the liquid flow; 5) the direction of liquid flow; 6) bubble size; or 7) any combination thereof. The inventors have discovered that providing liquid flow past the surface of a membrane at the herein described CFV with a decreased or eliminated contribution to the CFV provided by air, produces a shearing stress on the surface of the membrane that provides a desired cleaning of the membrane. A CFV with a decreased contribution provided by air refers to aeration, such as bubbling, making up less than about 50%, less than about 40%, less than about 30%, less than about 20%, less than about 10%, less than about 5%, or less than about 1%, of the CFV of liquid flow past a membrane surface.

Optionally, the herein described liquid flow CFV is provided at least, or solely, by adjusting a recirculation flow rate. The flow rate of influent, or wastewater into an MBR, is conventionally called Q. Liquid flow may be provided by recirculating liquid through membrane units. In an MBR, mixed liquor that flows through the membrane units is related to providing return activated sludge (RAS). The membrane units and tank replaces the secondary clarifier. In some other examples, the membrane tank could be part of another filtration system such as a surface or underground water filtration system, intended to produce potable water or industrial process water, or a tertiary filtration system, intended to polish wastewater that has already been treated by another process. In surface water filtration, liquid flowing through the membrane units may be referred to as feed flow. In tertiary filtration, liquid flowing through the membrane units may be referred to as secondary effluent. In surface water or tertiary filtration, flow through the membrane units is related to providing a return flow (RF), alternatively called a recirculating flow or feed flow, on a system level. The recirculation flow rate may be adjusted to be, for example, from about 1Q to about 10Q, for example, from about 2Q to about 5Q; about 1Q, about 2Q; about 3Q; about 4Q; about 5Q; about 6Q; about 7Q; about 8Q; about 9Q; about 10Q; or from any recirculation flow rate listed above to any other recirculation flow rate listed above. Preferably, the recirculation flow rate is from about 2Q to about 5Q. Optionally, one or more liquid pumps, for example high flow liquid pumps, may be located along the recirculation flow pathway and used to adjust the recirculation flow rate by, for example, adjusting the rate of influent, and/or adjusting the rate of effluent.

Optionally, the herein described liquid flow CFV is provided at least, or solely, by adjusting the cross-sectional area between membranes. In some example, the face-to-face spacing between the membranes may be less than about 6.0 mm, for example, from about 0.1 mm to about 6.0 mm; from about 1.0 mm to about 4.0 mm; about 6.0 mm; about 5.0 mm; about 4.0 mm, about 3.0 mm; about 2.0 mm; about 1.5 mm; about 1.0 mm; about 0.5 mm; about 0.1 mm; or from any spacing distance listed above to any other spacing distance listed above. Preferably, the face-to-face spacing between the membranes is from about 1.0 mm to about 4.0 mm. Optionally, the herein described liquid flow CFV is provided at least, or solely, by adjusting the spacing between walls of a membrane tank and the front, sides, and back of a membrane unit adjacent the walls. Shorter distances between walls of a membrane tank and the front, sides, and back of a membrane unit adjacent the walls may be preferably, for example when more targeted flow is desired. The shape of a membrane tank housing a membrane unit may be any shape provided that the desired CFV is achieved. The membrane tank may have a circular, oval, rectangular, or square shape.

Optionally, the liquid flow is aerated at a rate that contributes less than about 50%, less than about 40%, less than about 30%, less than about 20%, less than about 10%, less than about 5%, or less than about 1%, to the herein described liquid flow CFV, for example, the aeration flow rate is less than about 0.03 scfm or 0 scfm; from about 0.0001 scfm to about 0.03 scfm; from about 0.003 scfm to about 0.012 scfm; about 0.0001 scfm; about 0.0005 scfm; about 0.001 scfm; about 0.0015 scfm; about 0.002 scfm; about 0.0025 scfm; about 0.003 scfm; about 0.0035 scfm; about 0.004 scfm; about 0.0045 scfm; about 0.005 scfm; about 0.01 scfm; about 0.012 scfm; about 0.015 scfm; about 0.02 scfm; about 0.025 scfm; about 0.03 scfm; 0 scfm; or from any aeration rate listed above to any other aeration rate listed above. Preferably, the aeration flow rate is from about 0.003 scfm to about 0.012 scfm. Optionally, the liquid flow is not aerated. The rate of aeration may be controlled by adjusting the amount of air pushed through one or more aerators located below a membrane unit or by eliminating aerators. The size of the bubbles produced by aerators may be adjusted provided that the desired CFV is achieved, for example, course bubbles having an average bubbles diameter ranging from about 5.0 mm to about 9.0 mm may be used. Fine bubbles, having an average bubble diameter from about 5.0 mm or less may also be used.

Optionally, the herein described liquid flow CFV is provided at least, or solely, by adjusting the direction of liquid flow. Optionally, the liquid flow is directed to the bottom of an immersed membrane unit. Optionally, the flow of mixed liquor may be divided into multiple portions. In some cases, the flow rate of each of the multiple portions is within 10% of an average flow rate of the multiple portions. Optionally, the influent is further directed upwards through an immersed membrane unit. The flow of influent water upwards through a membrane unit can help to force adjacent membranes apart from each other, inhibit the dewatering or retention of sludge in the membrane unit, and/or disperse fresh influent throughout the membrane unit. In some cases, a once-through or vertical plug flow regime may be provided through the membrane unit.

Optionally, one or more ducts, extending horizontally below a membrane unit, directs the liquid to the membrane unit. In some examples, the ducts extend along the length of a tank comprising one or more membrane units. The duct has one or more gaps that have an area that is at least 80% of the horizontal cross sectional area of a membrane unit over it. The duct optionally has baffles so that liquid flowing through the baffles can disperse over the entire area of the gaps before entering the membrane unit. The location and size of the gaps and baffle openings help provide a selected division and selected direction of the total liquid flow, for example influent mixed liquor flow, to the membrane unit. Preferably, at least 90%, or at least 95%, of the influent entering a membrane tank is directed through the duct to a membrane unit. In some examples, the herein described methods and systems do not comprise ducts.

Optionally, the viscosity and/or solids content of the liquid flow may be adjusted by, for example, adjusting the dilution of the contents in the liquid flow.

Figure 2:
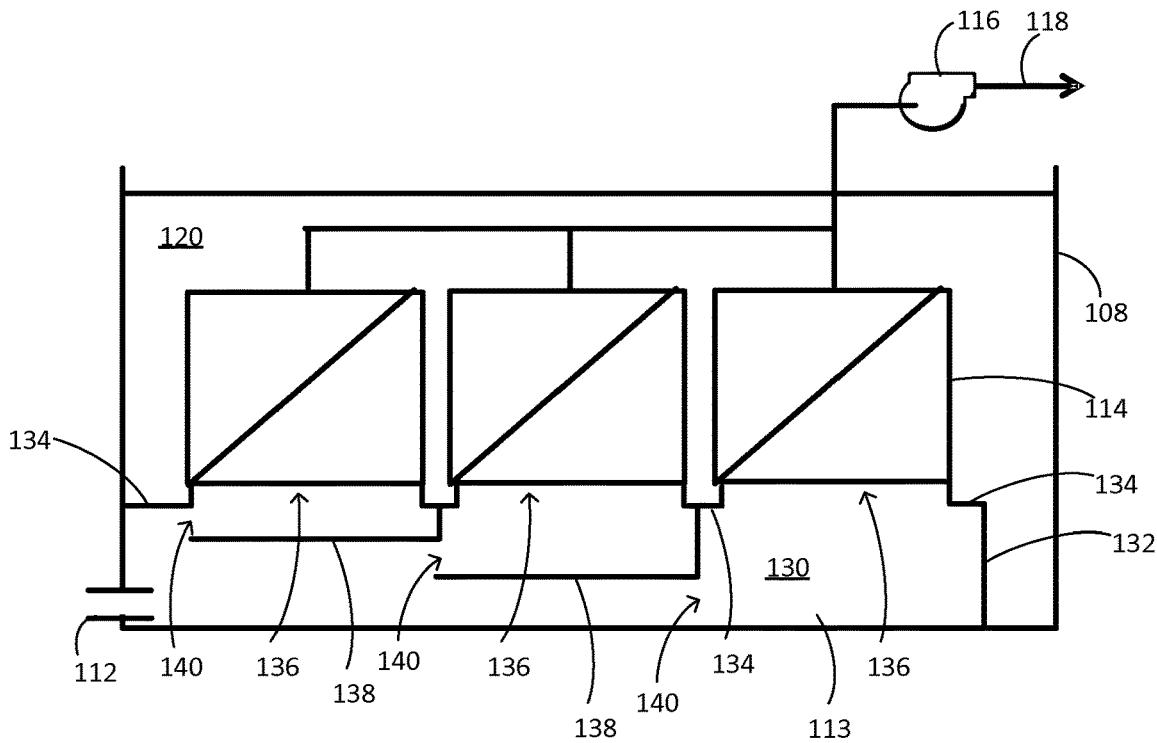
FIG. 2 is a schematic side view of a membrane tank of the membrane bioreactor of FIG. 1 with one side removed showing a duct.
Figure 3:
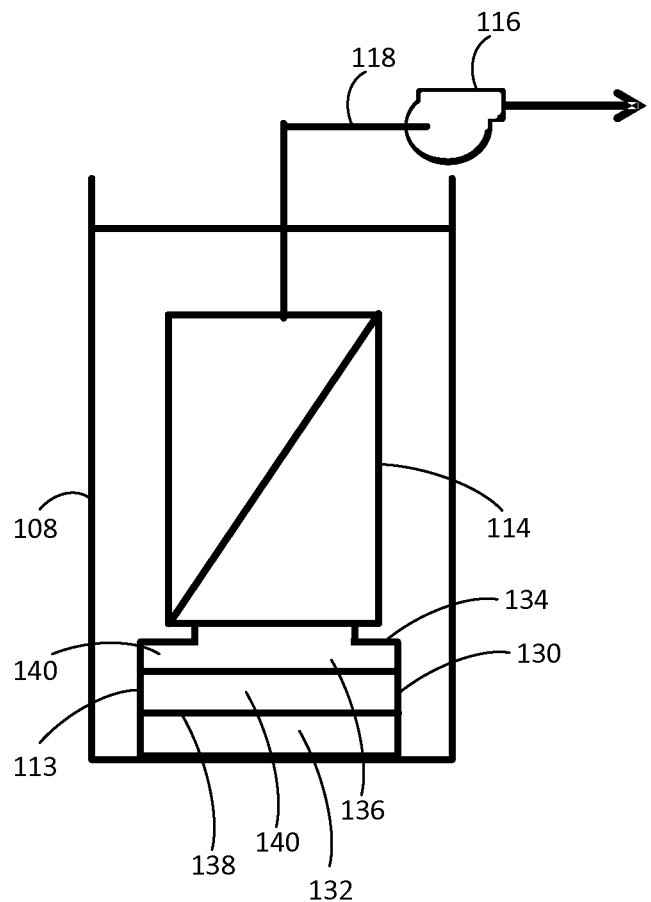
FIG. 3 is a schematic end view of the membrane tank of FIG. 2 with the front of the tank removed.

FIGS. 1 to 3 show an example of a filtration system 100 using the herein disclosed process of operating an immersed membrane system. Effluent 102 from an upstream treatment unit (not shown), for example, a primary treatment unit, a clarifier, or a rotating belt filter in an MBR, flows to one or more process tanks 104. In MBR, there may be one aerobic process tank 104, or there can be a series of two or more process tanks 104 containing aerobic, anoxic, and/or anaerobic treatment zones. The effluent 102 is processed in the process tanks 104 and produces influent 106. In an MBR, microorganisms in the process tanks 104 digest the effluent 102 and produce mixed liquor 106. Influent 106 is transferred to a membrane tank 108. In the example shown, influent pump 110 pumps the influent 106 to the membrane tank 108 through inlet 112. In some other examples, the membrane tank 108 could be part of another filtration system such as a surface or underground water filtration system, intended to produce potable water or industrial process water, or a tertiary filtration system, intended to polish wastewater that has already been treated by another process.

The membrane tank 108 contains one or more ducts 113 and one or more membrane units 114. The one or more ducts 113 extend from inlet 112 of the membrane tank 108 to the bottom of the membrane units 114. Duct 113 provides a plenum that influent 106, which in this example is mixed liquor 106, flows through in the membrane tank 108 to reach one or more membrane units 114. The influent 106 then flows upwards through the membrane units 114 and into the membrane tank 108 outside of the membrane units 120. A permeate pump 116 withdraws permeate 118 from the mixed liquor 106 as it passes through the membrane units 114. Accordingly, the mixed liquor 106 is concentrated in the membrane units and leaves the membrane units as activated sludge 122. Activated sludge 122 is withdrawn from the membrane tank 108, for example by pump or gravity, and divided into waste activated sludge (WAS) 124 and return (or recycled) activated sludge (RAS) 126. In the example shown in FIGS. 1 to 3, the flow rate of the effluent into the filtration system 100 is Q, and the recirculation flow rate is from about 1Q to about 10Q.

The membrane tank 108 is shown in side view in FIG. 2 and end view in FIG. 3. The membrane tank 108 may have a length that is 2 times or more, or 4 times or more, than the width of the membrane tank 108. The spacing between the walls of the membrane tank 108 and the front, sides and back of the membrane units 114 could be closer than in the examples shown.

In the example shown, a duct 113 is formed in part by the bottom of the membrane tank 108. Sidewalls 130 extend upwards from the bottom of the membrane tank 108 to the bottom of the membrane units 114. The duct 113 extends along the length of the tank 108 below the membrane units 114. The downstream end of the duct 113 is closed by an end wall 132. The top of the duct 113 is formed of plates 134. The plates 134 are discontinuous, providing gaps 136 generally equal in length and width to horizontal dimensions of the membrane units 114.

The duct 113 optionally has baffles 138. In the example shown, the baffles 138 extend downwards from the plates 134 so that liquid flowing through the baffles 138 can disperse over the entire area of the gaps 136 before entering the membrane units 114. A gap 136 may have an area that is at least 80% of the horizontal cross sectional area of a membrane unit 114 over it. The baffles 138 also extend horizontally at least part way, optionally all of the way, below the bottom of one or more membrane units 114. In the example shown, the baffles extend horizontally about parallel with the bottom of the membrane tank 108. Alternatively, the baffles may be angled, which may reduce turbulence. The horizontal extension of the baffles 138 defines an opening 140. Optionally, the openings 140 have different sizes relative to each other to help provide a selected division of the total influent mixed liquor flow to the membrane units 114. The horizontal extension of a baffle 138 over substantially all (i.e. 80% or more or 90% or more) or all of the bottom of a membrane unit 114, but displaced below to the top of the duct 113, tends to produce a selected distribution of the influent flow among the membrane units 114 over a broader range of influent flow rates. Without intending to be limited by theory, this may be in part because the openings 140 are small (i.e. 50% or less) in area relative to gaps 136 or because the openings 140 face into the influent flow upstream of the gaps 136.

In the example shown, the height of an opening 140 associated with a first (upstream) baffle 138 is defined by the vertical distance between the first baffle 138 and the plates 134. The height of an opening 140 associated with an intermediate baffle 138 is defined by the vertical distance between the intermediate baffle 138 and first baffle 138. A baffle 138 for the most downstream membrane unit 114 is provided by part of the floor of the tank 108 and the end 132 of the duct 113. An opening 140 for the most downstream membrane unit 114 is defined between the intermediate baffle 138 and the bottom of the tank 108. Alternatively, a separate duct 113 could be provided for each membrane unit 114, but it is expected that this would require additional material and fabrication and possibly increase the overall head loss of the duct or ducts 113. In the example shown, the parts of the duct 113 between the openings 140 and the gaps 136 provide paths for mixed liquor to flow from the duct 113 into the bottom of the membrane units 114.

The membrane units 114 optionally include a membrane case, alternatively called a shroud, which is a structure that provides a vertically extending conduit containing the membranes themselves. The membrane case can be a separate structure or may be formed integrally with other parts of the membrane unit 114. In the example shown, the membrane tank 108 does not include aerators that produce bubbles when air is provided with air from a blower. In some examples, the membrane tank 108 may include aerators that contributes less than about 50%, less than about 40%, less than about 30%, less than about 20%, less than about 10%, less than about 5%, or less than about 1%, to the herein described liquid flow CFV past a membrane surface, for example, at a rate of less than about 0.03 scfm/ft$^2$, or 0 scfm/ft$^2$. The aerators may be located within the membrane case, or placed below the membrane units 114, optionally in a shroud or aerator case that provides a vertically extending conduit connecting the duct 113 with a membrane unit 114. If the membranes are within a membrane case, the membranes are preferably arranged to provide vertical passages for liquid to flow upwards past the membranes, through the membrane units. For example, the membranes may be flat sheet membranes or flat ceramic membranes.

In some examples, connections between the duct 113 and the mixed liquor inlet 112, and connections between the duct 113 and the bottom of the membrane units 114, are generally fluid tight. Other than connections to the inlet 112 and the membrane units 114, the duct 113 is generally a closed plenum. Membrane and aerator cases, if used, are generally closed tubes. In this way, the influent to the membrane tank 108 is provided generally directly to the membrane units 114. There is substantially no mixing of previously concentrated influent in the membrane tank 108 with influent being fed to the membrane units through the duct 113. However, as these are large civil works, perfectly fluid tight connections or perfectly closed ducts or membrane cases are not expected. Connections between, for example, a bent sheet metal flange of a duct 113 and the concrete wall or floor of a membrane tank 108, or the frame of a cassette 50, may leak to some extent, and the duct 113 itself might be made of multiple pieces that are not connected together with perfectly fluid tight connections. However, the use of an open membrane tank 108 and immersed membrane units 114 allows for more economical construction of large systems relative to a completely enclosed system.

Despite being in an open membrane tank 108, which is conventionally operated as a stirred tank reactor, the membranes units 114 in the example of FIGS. 2 and 3 can operate under a flow regime that is more like a once-through crossflow. Preferably, at least 90%, or at least 95%, of the influent entering the membrane tank 108 is directed through the duct 113 to the membrane units 114, and no more than 10%, or no more than 5%, of influent flowing upwards through the membrane units 114 is influent from the membrane tank 108 outside of the duct 113 as opposed to influent from the inlet 112 to the membrane tank 108. Optionally, the duct 113 and connections to and from it are sufficiently closed and tight such that the total suspended solids (TSS) concentration of influent at the bottom of the membrane units 114 is not more than 5%, or not more than 3%, higher than the TSS concentration of the influent. The concentration of influent reaching membrane units 114 in different parts of the membrane tank 108 is thereby also generally equalized. The duct 113 can also help to provide a generally even distribution of flow to membrane units 114 in different parts of the membrane tank 108. In examples where the membrane units 114 include membrane cases, the concentration of the water leaving the membrane units 114 is also generally equalized. For example, in an MBR 100 as in FIG. 1, the total suspended solids (TSS) concentration of water (concentrate) at the top of the membrane units 114 is not more than 5% less than the TSS concentration of the activated sludge 120 in the membrane tank 108 as a whole. In the case of an MBR 100, where the mixed liquor 106 and activated sludge 120 are high in solids, reducing a difference in solids concentration between membrane units 114 can reduce the membrane cleaning frequency and may increase average flux of the membrane units 114.

FIGS. 4 to 14 describe an example of a cassette 50, or various parts of it. The cassette 50 may be used, alone or in a set of multiple cassettes 50, to provide a membrane unit 114.

Figure 4:
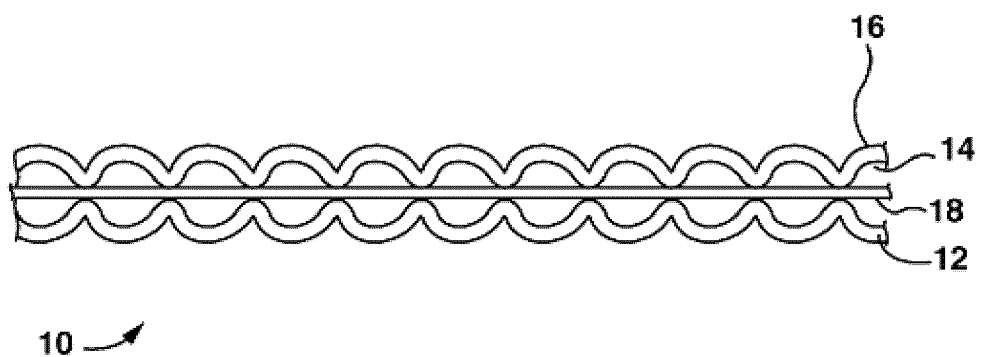
FIG. 4 is an edge view of a membrane sheet.

FIG. 4 shows an example of a membrane sheet 10, alternatively called an element. The membrane sheet 10 is made up of two substrate sheets 12 formed and bonded together to provide internal channels 14. The outsides of the substrate sheets 12 are coated with a porous separation layer 16. The separation layer 16 may be made by casting a membrane forming dope over the substrate sheets 12 and then curing the dope in a quench bath. This produces pores according to the non-solvent induced phase separation (NIPS) method, typically in the ultrafiltration or microfiltration range. A central sheet 18 between the two substrate sheets 12 is optional but may be added to provide a more rigid membrane sheet 10 if desired. In other examples, elements can be made of two flat sheet membranes attached together over a frame or spacer, for example in the manner of Kubota or Microdyn Nadir elements. In other examples, elements can be made of plate form ceramics.

Figure 5:
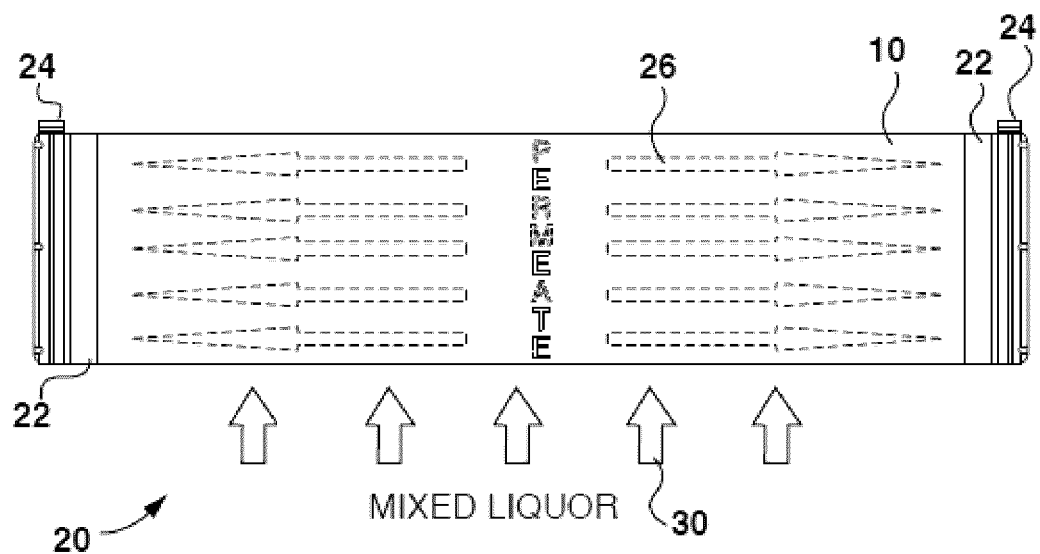
FIG. 5 is an elevation view of a membrane unit module including a membrane sheet as in FIG. 4.

FIG. 5 shows a membrane module 20. The module 20 has one or more membrane sheets 10. The edges of the membrane sheets 10 that are open to the internal channels 14 (i.e. the edge shown in FIG. 5) are potted in headers 22, alternatively called potting heads or permeate collectors. When in use, the headers 22 are oriented generally vertically and the internal channels 14 are generally horizontal. Suction applied to permeate ports 24 of the headers 22 for example by pump or siphon causes permeate 26 to be produced in the internal channels 14 and flow through the headers 22. Optionally, permeate can be withdrawn from one or both ends of the membrane sheet 10. A module typically has multiple parallel membrane sheets 10. Adjacent membrane sheets 10 are separated by vertical gaps of generally equal width, for example from about 0.1 mm to about 6.0 mm wide. In one example, a module 20 is about 1900 mm wide, about 800 mm high and about 60 mm thick and contains 16 membrane sheets 10 spaced generally equally across its thickness. In this example, the headers 22 and the outer membrane sheets 10 form a membrane case. In other examples, a module may be surrounded by a separate membrane case.

Figure 6:
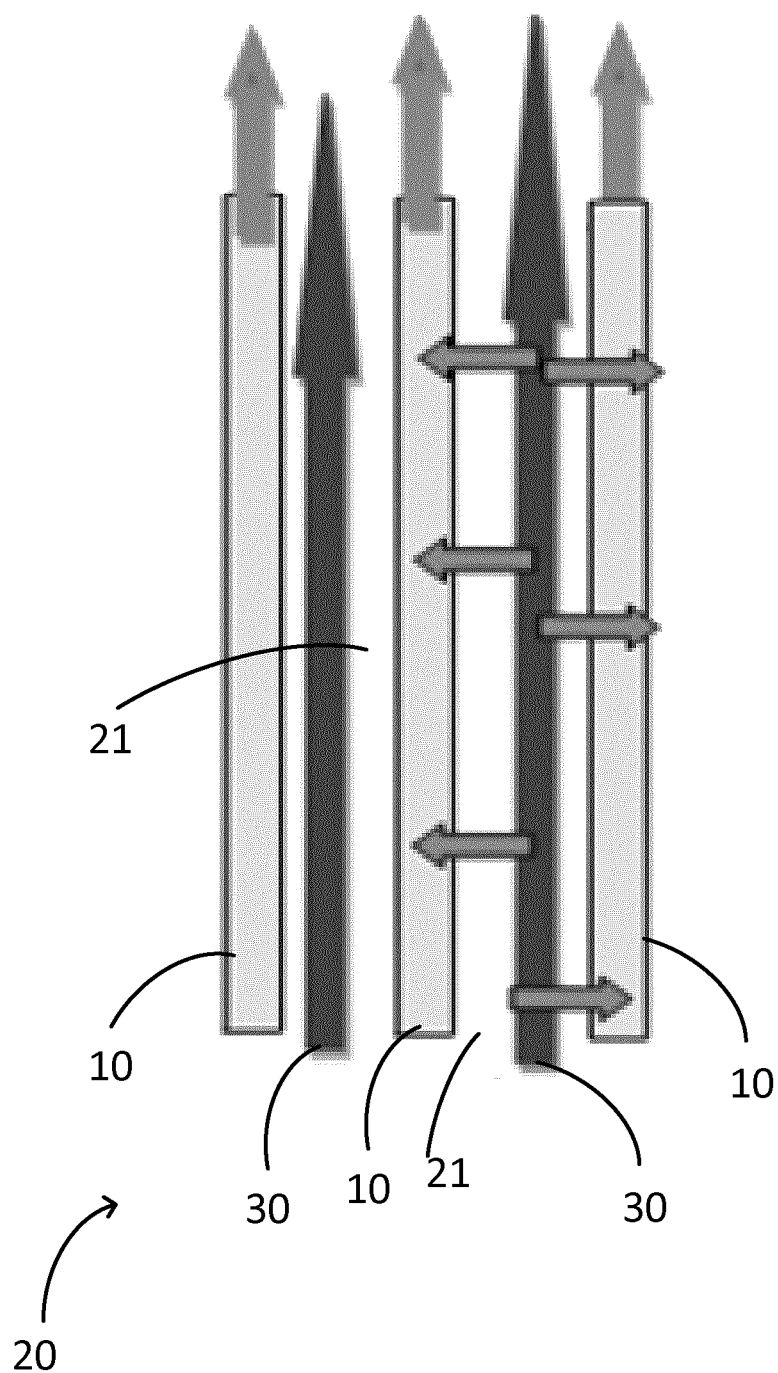
FIG. 6 is a cross-sectional view of a portion of the membrane unit of FIG. 5.

FIG. 6 shows a portion of the membrane module 20 of FIG. 5. When used in a membrane bioreactor (MBR) or a filtration plant, liquid 20 being filtered (e.g. recirculation flow) is provided from below the module 20 and flows upwards through the module 20, including through the gaps 21 between adjacent membrane sheets 10.

Figure 7:
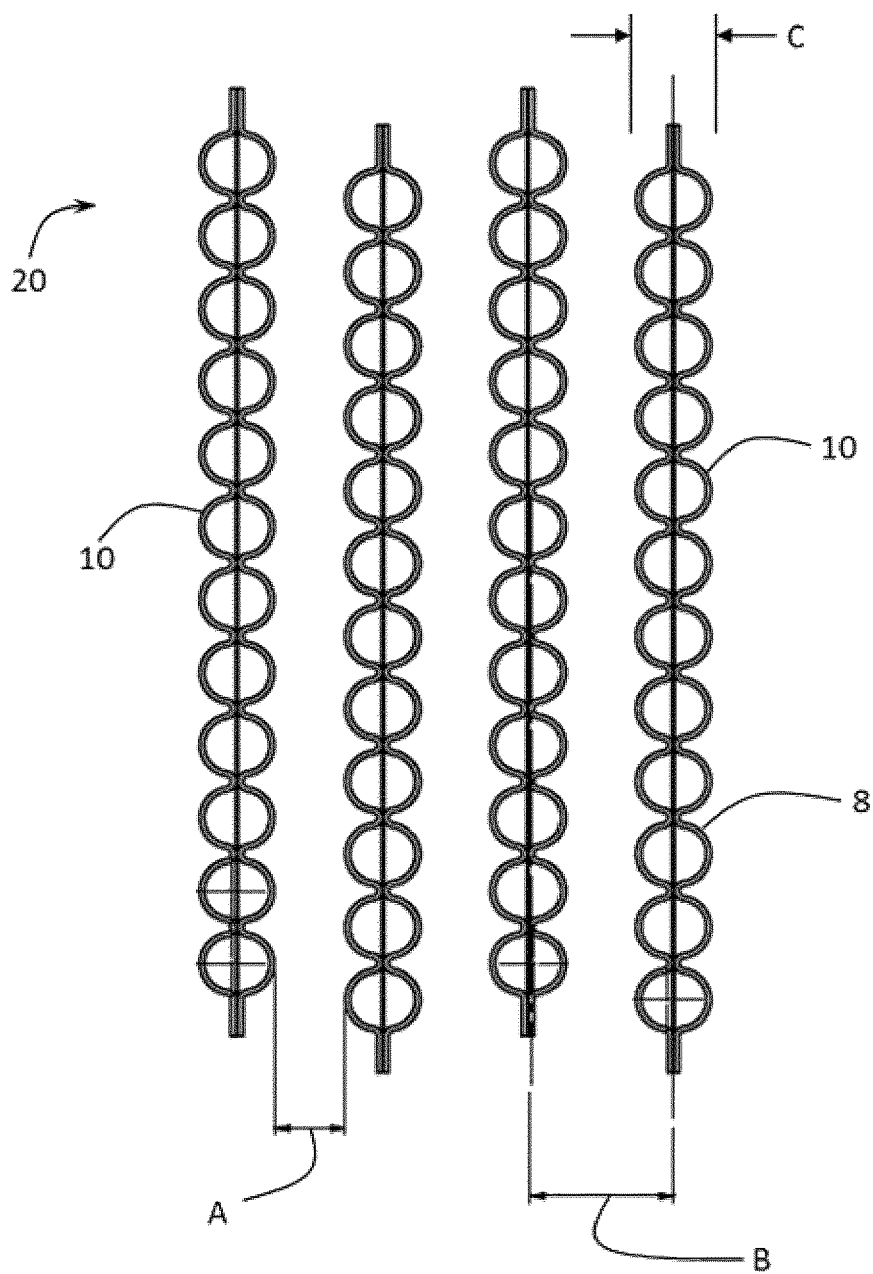
FIG. 7 is a cross-sectioned view of a membrane unit of FIG. 6 showing the spacing and arrangement of membrane sheets as shown in FIG. 5.

FIG. 7 shows a set of membrane sheets 10 in a module 20. The membrane sheets 10 have depressions 8. The membrane sheets 10 have a width or thickness C. In the example shown, the thickness C is measured at the extremity of the regular surface features, which cover most of the membrane surface area. A smooth side flat sheet membrane has a width or thickness C that is generally constant throughout the sheet 10. The membrane sheets 10 also have a center-to-center spacing B.

The membrane sheets 10 have a face-to-face spacing A. Unless stated otherwise, any reference to spacing therein, or to the membrane sheets being spaced apart or other similar statements, refers to the face-to-space spacing. Spacing A is equal to the center-to-center spacing B minus the width C. As shown in FIG. 7, adjacent sheets can be arranged with the depressions 8 offset from each other vertically, for example by half of the vertical distance between adjacent depressions 8 in a sheet 10. The membrane sheets are spaced closely together, for example, with a spacing A of about 6.0 mm or less, about 5.0 mm or less, about 4.0 mm or less, about 3.0 mm or less, about 2.0 mm or less, for example, about 1.5 mm.

Figure 8:
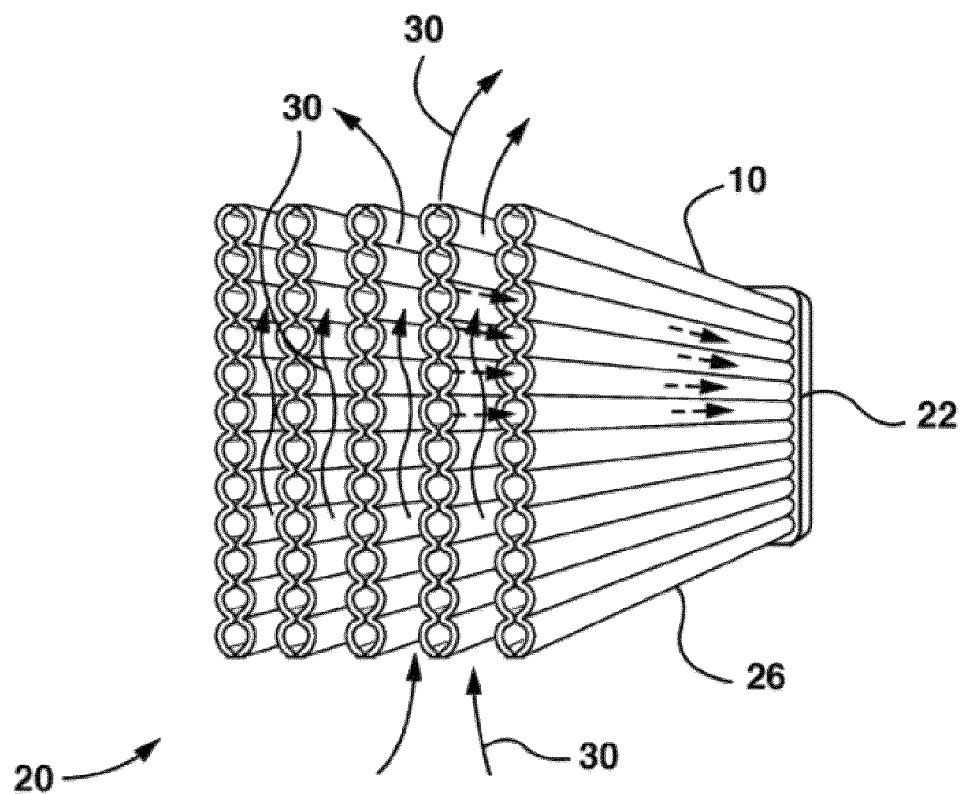
FIG. 8 is a schematic perspective view of a cut open module showing feed liquid and permeate flow directions.

FIG. 8 shows a schematic view of a module 20 cut open to further illustrate the flow of liquid 30 through the module 20. In this example, the membrane sheets 10 have an undulating shape, which can create turbulence in the liquid 30 as it rises. The membrane sheets 10 may vibrate as the liquid 30 move between them. The liquid 30 flow may provide some direct scouring of the membrane sheets 10. In some examples, bubbles (not shown) provided at an aeration rate of less than about 0.03 scfm or 0 scfm, may move between membrane sheets 10 and cause them to vibrate. The bubbles may also provide some direct scouring of the membranes sheets 10 in addition to assisting the liquid flow.

Figure 9:
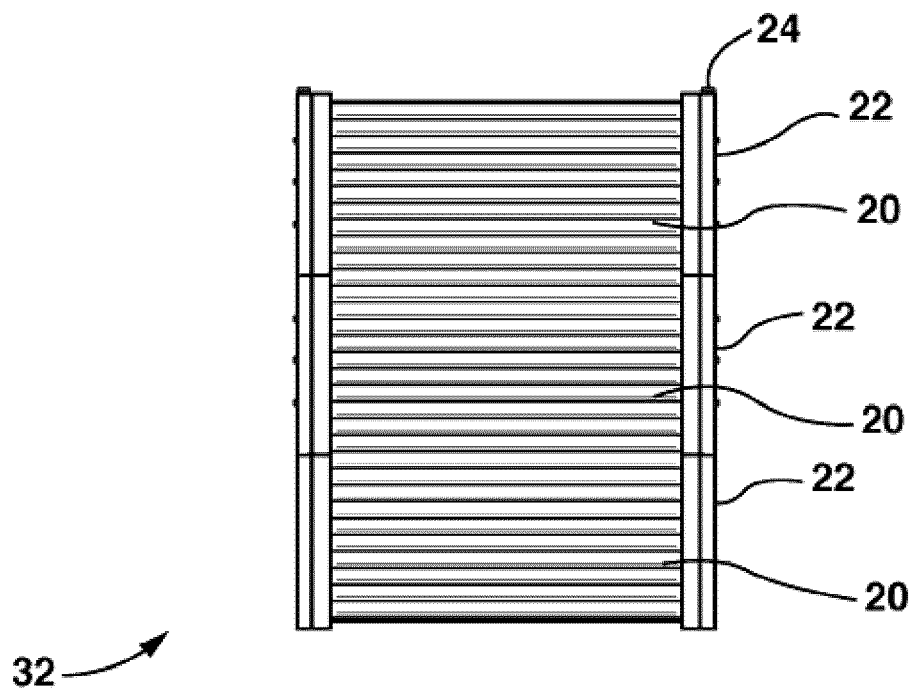
FIG. 9 is an elevation view of three of the modules of FIG. 8 stacked together.

FIG. 9 shows a stack 32 of three modules 20. The modules 20 are stacked vertically on top of each other. The permeate ports 24 of a lower module fit into sockets (not visible) in the headers 22 of an upper module. The sockets in the lowest module 20 are plugged. The permeate ports 24 of the highest module can be connected to a permeate withdrawal pipe and used to withdraw permeate from all three modules 20. Stacks 32 may also be made with two, four or other numbers of modules 20. Since the headers 22 of adjacent modules are vertically aligned and continuous, feed liquid can flow vertically through the entire stack 32 without being impeded by the headers 22.

Figure 10:
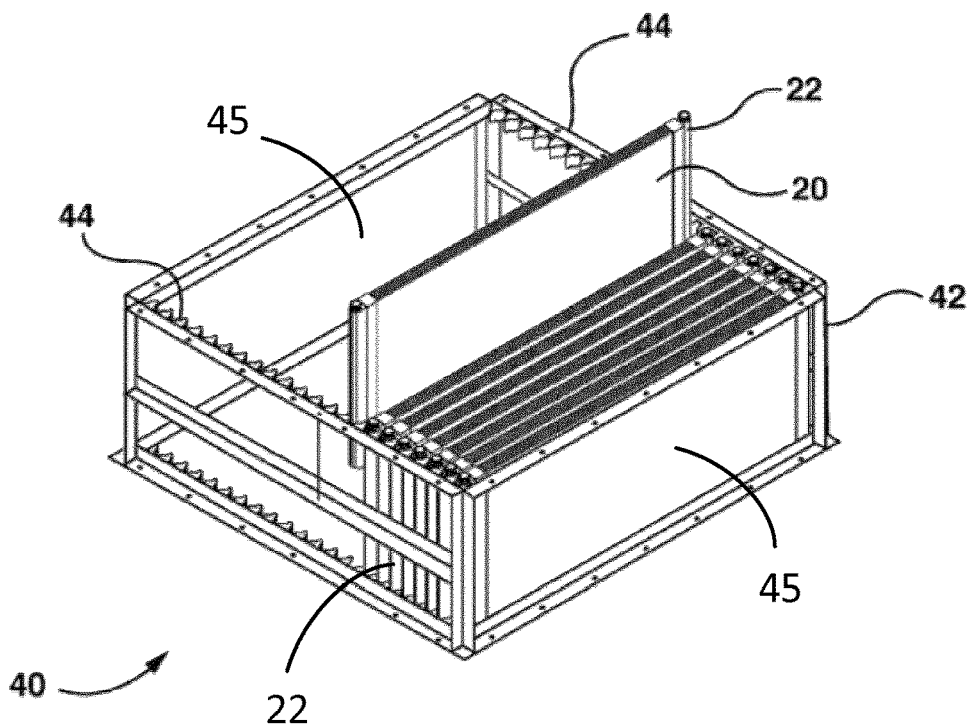
FIG. 10 is an isometric view of a block containing several of the modules of FIG. 8.

FIG. 10 shows a block 40 containing a plurality of modules 20 in a frame 42. The modules 20 are placed side by side in the frame 42. A module 20 may slide vertically into or out of the frame 42. When in the frame 42, the headers 22 of the module fit into corresponding slots provided, in the example shown, by plastic moldings 44 attached to the frame 42. The frame 42 is preferably made of stainless steel, although other materials may also be used. Side plates 45 cover the sides of the frame parallel to the modules 20. The headers 22 each include multiple modules 20 and adjacent headers 22 touch each other, or are close to touching, for example less than 10 mm apart from each other or less than 5 mm apart from each other. The side plates 45 and headers 22 thereby form an integral membrane case that defines a vertically extending fluid passageway through the block 40.

Figure 11:
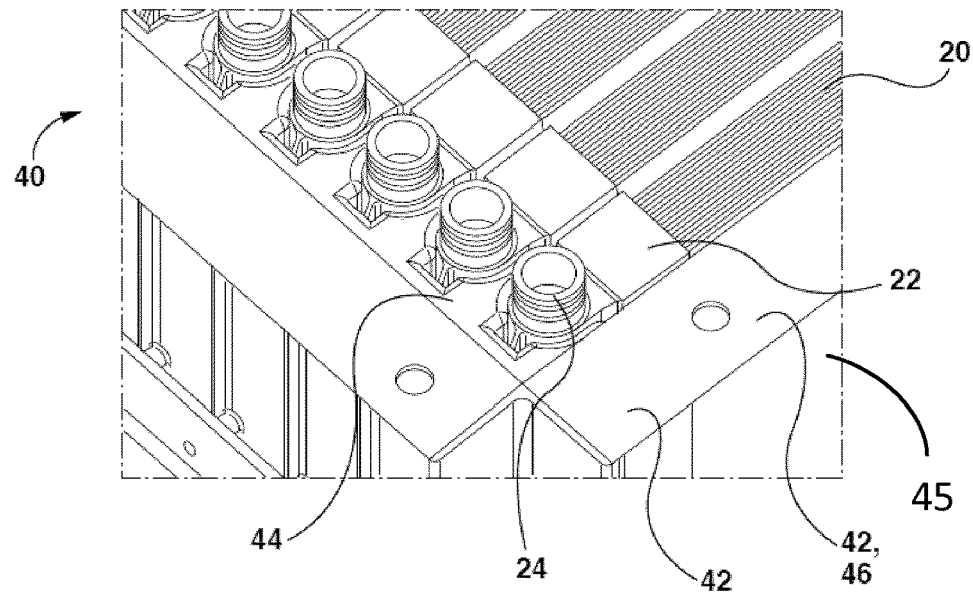
FIG. 11 is an enlarged view of part of the block of FIG. 10.

FIG. 11 shows an enlarged view of the top of a block 40. A flange 46 at the top of the block 40 and a similar flange (not shown in FIG. 10) on the bottom of the block can be used to support an upper or lower block 40 and to allow blocks 40 in a stack to be fastened together. The permeate ports 24 of the modules 20 protrude above the flange 46 to allow for permeate connection between modules 20 in a stack as described in FIG. 10.

Figure 12:
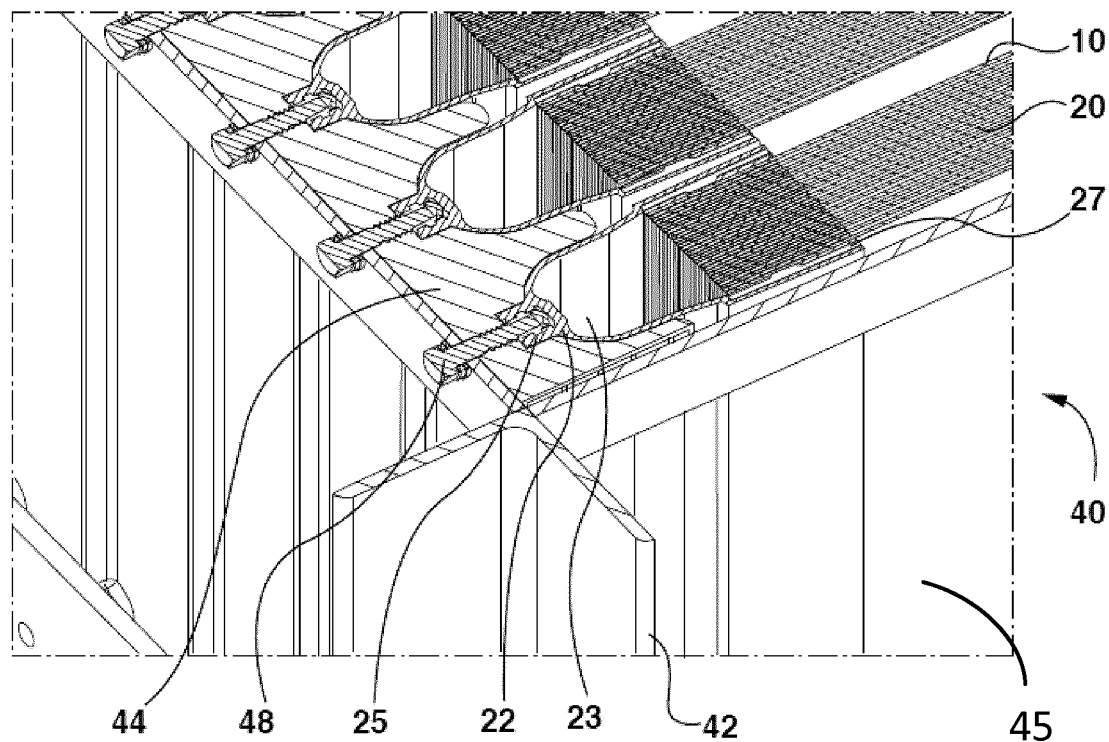
FIG. 12 is an enlarged view of part of the block of FIG. 10.

FIG. 12 shows an enlarged view of a horizontal section of part of the block 40. The header 22 contains a permeate chamber 23 defined by the header 22, the edges of the membrane sheets 10 and the potting resin 27 between the membrane sheets 10. The permeate chamber 23 is in fluid communication with the permeate ports 24 and sockets. To hold a module 20 in the frame 42, a bolt 48 passes through the frame 42 and is threaded into a nut 25 adhered to the header 22, or molded integrally with the plastic molded header 22 as shown.

Figure 13:
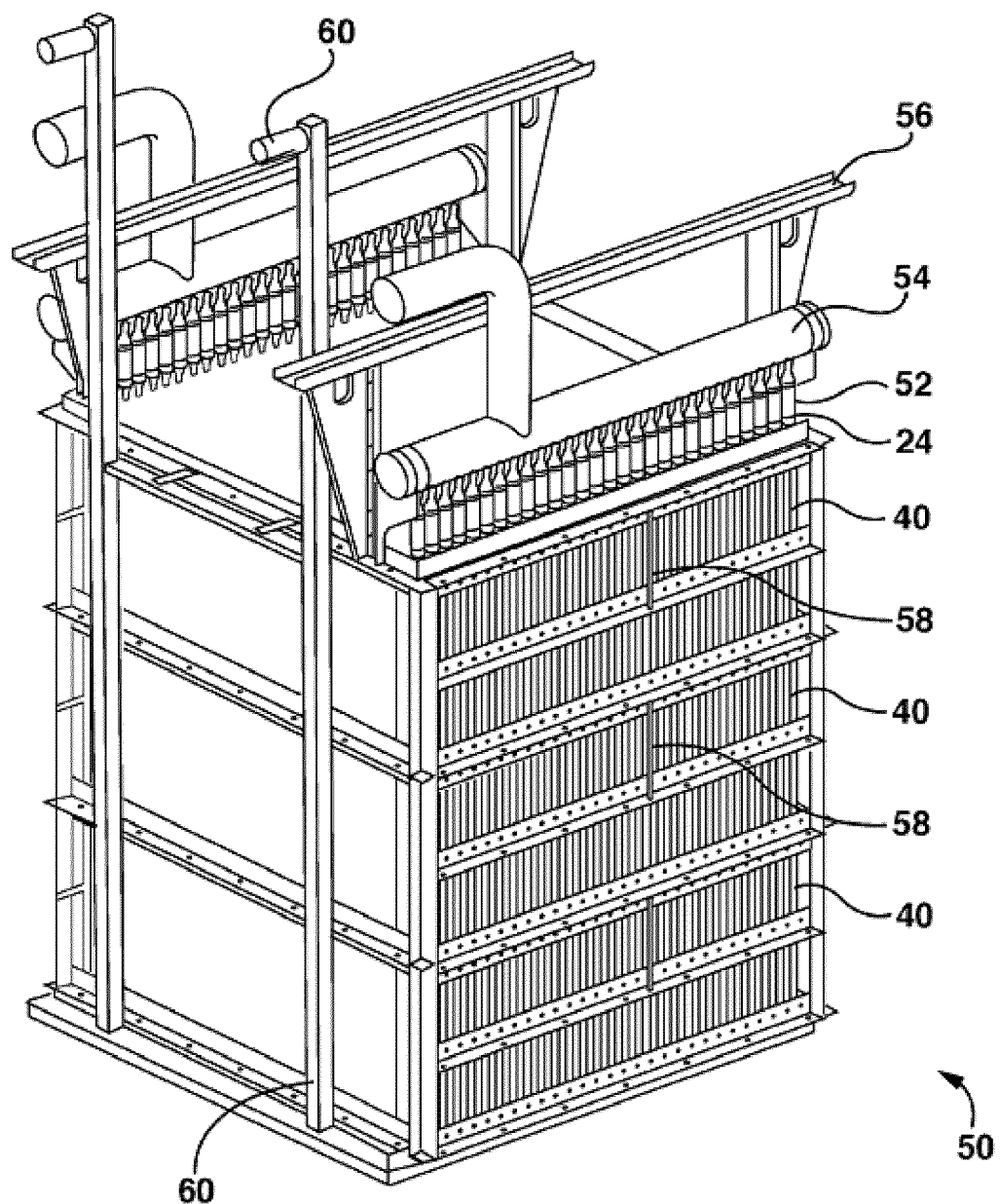
FIG. 13 is an isometric view of a cassette having three of the blocks of FIG. stacked together.

FIG. 13 shows a cassette 50 made up of three blocks 40 stacked vertically together, one on top of the other. Optionally, a cassette 50 made have one, two, four or another number of bocks 40. The permeate ports 24 of the upper block 40 are connected to a permeate header pipe 54, optionally through connector pipes 52 as shown. The frames 42 of the blocks 40 are connected to each other by struts 58 that, in the example shown, are threaded rods with nuts on their ends. Struts 58 also attach the upper block 40 to a cassette frame 56, which may be used to hang the cassette 50 in a tank. In the example shown, air supply pipes 60 bring air to the bottom of the cassette to be fed to a set of aerators (not visible) under the lowest block 40 at an aeration rate of less than about 0.03 scfm or 0 scfm. In other examples, the cassette does not comprise air supply pipes 60 and aerators. The moldings 44 and side plates 45 of vertically adjacent block 40 form a continuous vertically extending passageway for fluids to flow through the cassette 50. The cassette 50 as a whole thereby has an integral membrane case. Alternatively, a separate membrane case can be provided.

Figure 14:
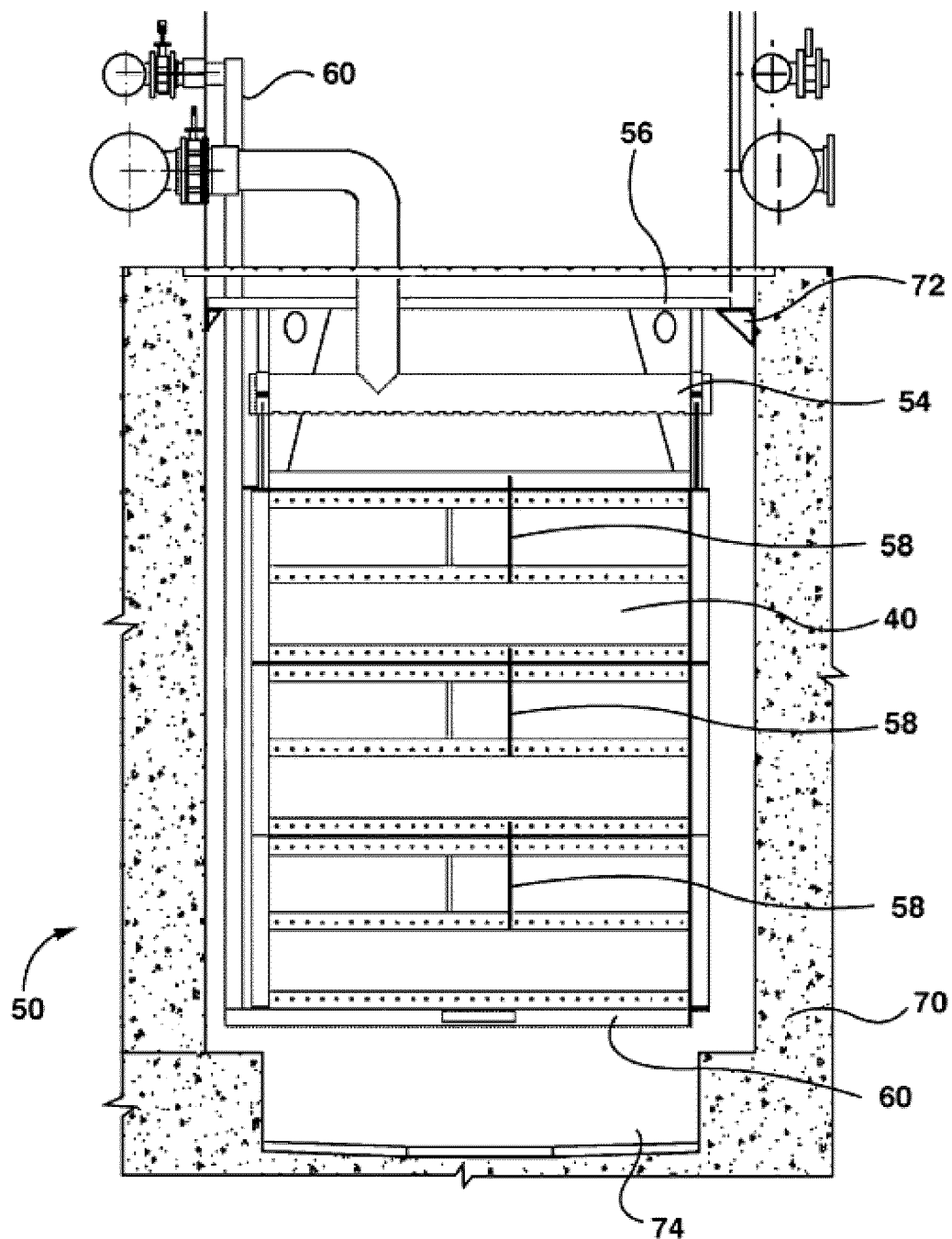
FIG. 14 is an elevation view of the cassette of FIG. 13 in a tank.

FIG. 14 shows a cassette 50 installed in a tank 70. The cassette 50 can be lowered into a membrane tank 70, or lifted out of the membrane tank 70, by a crane or hoist attached to the cassette frame 56. The cassette frame 56 may rest on ledges of the membrane tank 70. The cassette frame 56 rests on the walls of the tank 70, in particular on ledges 72 attached to the tank 70 in the example shown. Alternatively, the cassette 50 can rest on the bottom of the tank 70, or the cassette 50 can be attached to a frame or other structure that rests on the bottom of tank 70. In the example shown, the cassette 50 has 84 modules 20. The packing density by volume is 450-500 $m^2/m^3$. Packing density by footprint is about 850 $m^2/m^3$. In one example, each module 20 is from about 7 to about 10 cm wide. The modules 20 may be arranged in a vertical stack from 1 to 5 modules 20 high in a cassette 50. Each stack of modules 20 in the cassette 50 has one aerator about 3-6 cm wide below the lowest module 20 in the stack.

The tank 70 optionally surrounds the cassette 50 closely as shown. Mixed liquor (or other feed liquid) is preferably fed into a channel 74 at the bottom of the tank 70 from one end of the tank and exits from a weir (not shown) at the top of the opposite end of the tank 70. This arrangement provides an average upwards flow of feed liquid through the modules 20. Multiple cassettes 50 can be spaced along the length of the tank 70 and combined to make a membrane train. A complete membrane system may have one or more trains. In the example shown, air supply pipes 60 bring air to the bottom of the cassette to be fed to a set of aerators (not visible) under the lowest block 40 at an aeration rate of less than about 0.03 scfm or 0 scfm. In other examples, the cassette does not comprise air supply pipes 60 and aerators.

Additional information describing suitable membrane sheets, modules, blocks and cassettes can be found in US Publication Number US 2017/0095773, Method of Operating Membrane Filter by Fibracast Ltd published on Apr. 6, 2017, International Publication Number WO 2013/056373, Coating Device and Process for Coating Formed Sheet Membrane Element by Fibracast Ltd. published on Apr. 25, 2013, International Publication Number WO 2011/130853, Formed Sheet Membrane Element and Filtration System by Fibracast Ltd. published on Oct. 27, 2011, International Publication Number WO 2020/006628, Tightly Spaced Flat Sheet Immersed Membranes and Fine Bubble Aeration by Fibracast Ltd. published on Jan. 9, 2020, and which are incorporated herein by reference.

EXAMPLES

Example 1

Figure 15:
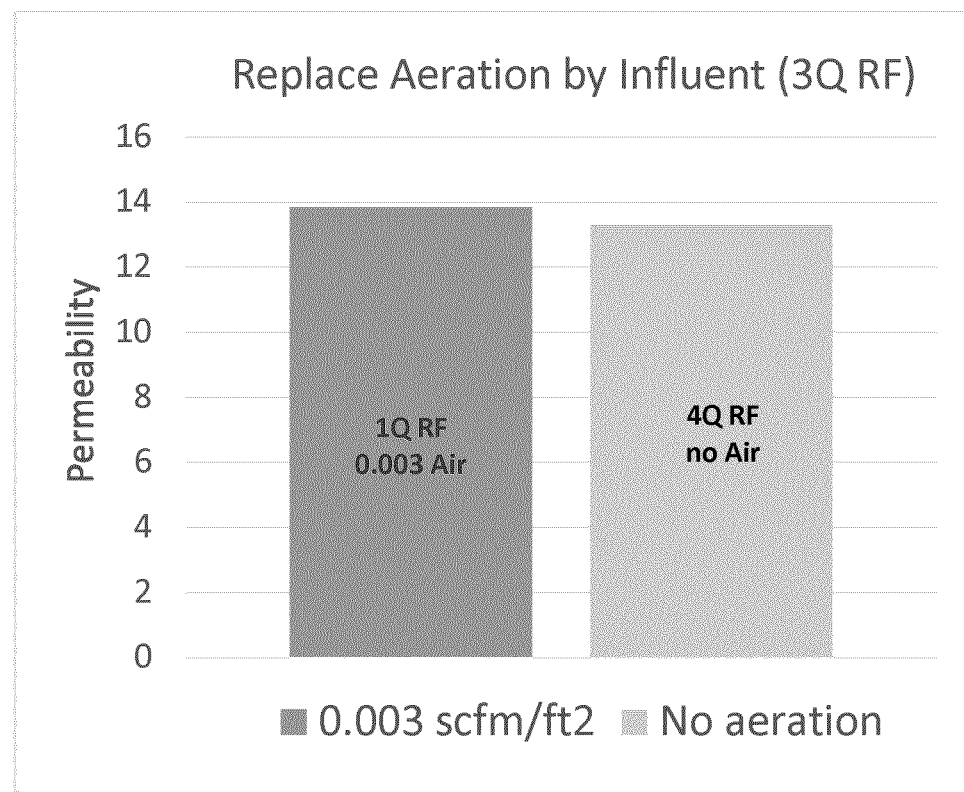
FIG. 15 is a graph and table from permeability studies comparing aeration levels at different recirculation flow rates.
Figure 16:
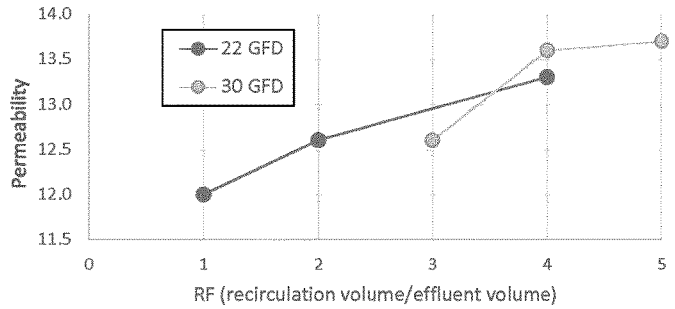
FIGS. 16A-D are tables and graphs from permeability studies comparing various aeration levels and recirculation flow rates.
Figure 16:
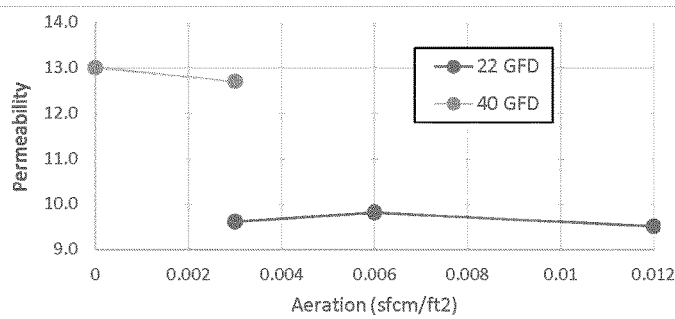

In a trial pilot example, the effect of aeration and recirculation flow rate on permeability was tested. A herein disclosed filtration system comprised a membrane unit 114 within a membrane tank 108 where each membrane unit 114 was in the form of a cassette 50 as shown in FIG. 13 consisting of four membrane modules with 1.5 mm face-to-face spacing between membrane sheets. A duct extending along the length of the tank and having a gap that covered about 80% of the horizontal cross sectional area of the membrane unit, directed liquid upwards and through the membrane unit. The membrane tank also comprised aerators located below the membrane unit. The filtration system was operated with: 1) a recirculation rate of 1Q and with bubble aerators providing 0.003 $scfm/ft^2$ of air below the membrane unit; and 2) a recirculation flow rate of 4Q with the bubble aerators providing 0 $scfm/ft^2$ of air below the membrane unit, i.e. the bubble aerators were turned off. Increasing the recirculation flow rate to 4Q with no air bubbles resulted in a membrane permeability within 10% of the membrane permeability using a recirculation rate of Q and 0.003 $scfm/ft^2$ of air (see FIG. 15).

Example 2

In another trial pilot example using a herein disclosed filtration system as described in Example 1, the effect of aeration and recirculation rate on permeability was tested. The filtration system was operated with: 1) increasing recirculation flow rates from 1Q to 5Q, with no aeration; and 2) increased aeration rates with consistent or near consistent recirculation flow rates. Increasing the recirculation flow rate increased permeability without aeration, while increasing aeration while maintaining a consistent or near consistent recirculation rate resulted in an initial increase in permeability and a subsequent decrease in permeability (see FIGS. 16A-D).

Example 3

Figure 17:
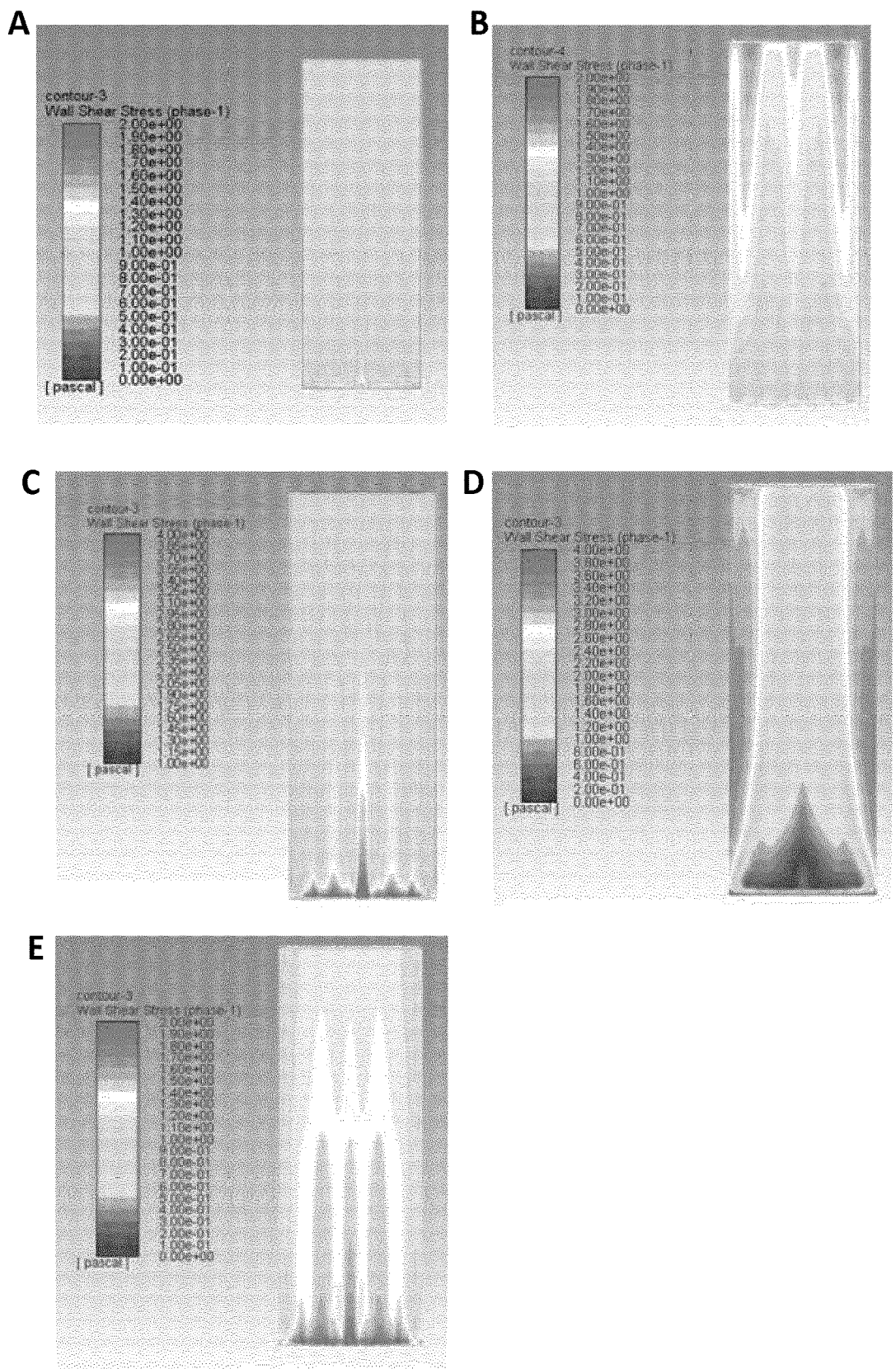
FIGS. 17A-E are graphs from shear stress studies comparing various aeration rates and recirculation flow rates.

In a trial model example, the effect of aeration and recirculation flow rate (also referred to as recycle flow) on shear stress was tested. A herein disclosed filtration system comprised a membrane unit 114 within a membrane tank 108 where each membrane unit 114 was in the form of a membrane module 20 as shown in FIG. 8. The membrane module 20 comprised six membrane sheets with 1.5 mm face-to-face spacing between the membrane sheets. A duct extending along the length of the tank and having a gap that covered about 80% of the horizontal cross sectional area of the membrane unit, directed liquid upwards and through the membrane unit. The membrane tank also comprised aerators located below the membrane unit. The filtration system was operated with: 1) a recirculation flow rate of 3Q with the bubble aerators providing 0 scfm/ft² of air below the membrane unit, i.e. the bubble aerators were turned off (see FIG. 17A); 2) a recirculation rate of 3Q and with bubble aerators providing 0.003 scfm/ft² of air below the membrane unit (see FIG. 17B); 3) a recirculation flow rate of 4Q with the bubble aerators providing 0 scfm/ft² of air below the membrane unit, i.e. the bubble aerators were turned off (see FIG. 17C); 4) a recirculation flow rate of 6Q with the bubble aerators providing 0 scfm/ft² of air below the membrane unit, i.e. the bubble aerators were turned off (see FIG. 17D); and 5) a recirculation rate of 6Q and with bubble aerators providing 0.003 scfm/ft² of air below the membrane unit (see FIG. 17E). The average velocity and average shear stress on the membrane surface was recorded (see Table 1 and FIGS. 17A-E).

The average velocity and average shear stress rate on the membrane surface increased with: 1) increasing the recirculation rate; and 2) increasing the contribution of air. A comparison between FIG. 17B (3Q and 0.003 scfm/ft²) and FIG. 17C (4Q and no air) shows that the effect of aeration on the mean velocity and shear stress rate decreases with increasing recirculation flow rate. A comparison of the difference between FIGS. 17A and B and the difference between FIGS. 17D and E shows that the effect of air decreases as the recirculation rate increases, and a higher mean velocity of liquid between the membrane sheets and average shear stress is obtained with recirculation than aeration.

TABLE 1

Comparison of cross flow and shear stress at different recirculation rates and air aeration rates.

| Case | Average velocity (m/s) | Average shear stress (pa) | FIG. |
|---|---|---|---|
| 1. Recycle flow 3Q-No air | 0.39 | 0.71 | FIG. 17A |
| 2. Recycle flow 3Q-Air 0.003 scfm/ft 2 | 0.45 | 0.93 | FIG. 17B |
| 3. Recycle flow 4Q-No air | 0.49 | 1.04 | FIG. 17C |
| 4. Recycle flow 6Q-No air | 0.74 | 2.05 | FIG. 17D |
| 5. Recycle flow 6Q-Air 0.003 scfm/ft 2 | 0.76 | 2.09 | FIG. 17E |

Example 4

Figure 18:
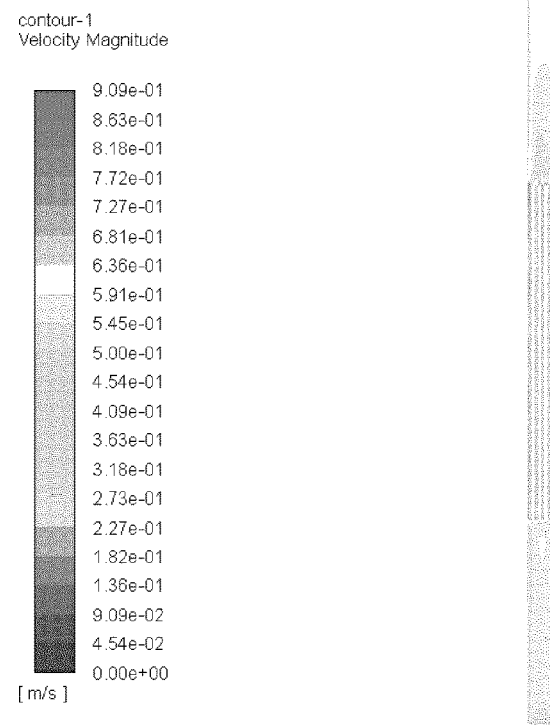
FIGS. 18A and B are graphs from cross flow velocity studies.
Figure 18:
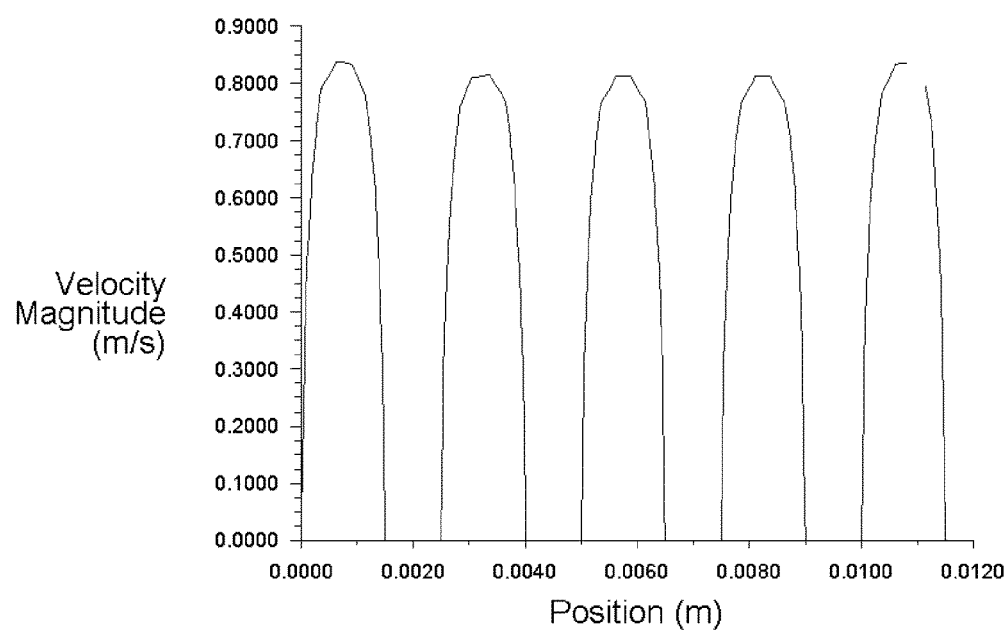

In another trial model example, the effect of aeration and recirculation flow rate on shear stress was tested. A herein disclosed filtration system comprised a membrane unit 114 within a membrane tank 108 where each membrane unit 114 was in the form of a membrane module 20 as shown in FIG. 8. The membrane module 20 comprised six membrane sheets with 1.5 mm face-to-face spacing between the membrane sheets. A duct extending along the length of the tank and having a gap that covered about 80% of the horizontal cross sectional area of the membrane unit, directed liquid upwards and through the membrane unit. The membrane tank also comprised aerators located below the membrane unit. The filtration system was operated with a recirculation flow rate of 4Q with the bubble aerators providing 0 scfm/ft² of air below the membrane unit, i.e. the bubble aerators were turned off. The velocity profile for a single phase (liquid) flowing past the membrane sheets is shown in FIG. 18A, and the corresponding velocity magnitude between pairs of adjacent membrane sheets is shown in FIG. 18B.

Although the detailed description and examples herein are based on corrugated flat sheet modules, it is expected that similar results would be achieved with smooth-side flat sheet modules. It is also expected that any specific process condition or physical dimension in a specific example can be varied by about 50% in either direction.

The invention claimed is:

1. A method of operating an immersed membrane system, comprising the steps of:
    providing a membrane tank having an immersed membrane unit, wherein the membranes have a face-to-face spacing between the membranes of about 6.0 mm or less;
    providing a liquid flow past the surface of the membranes, wherein the liquid flow has a cross flow velocity of from about 0.1 m/s to about 2.0 m/s; and
    aerating the immersed membrane unit at a rate of less than about 0.003 scfm/ft².

2. The method of claim 1, wherein the liquid flow is a recirculation flow.

3. The method of claim 2, wherein the recirculation flow rate is from about 1Q to about 10Q.

4. The method of claim 1, wherein at least a portion of the liquid flow is directed to the bottom of the membrane unit.

5. The method of claim 4, wherein at least 90% of the liquid flow is directed to the bottom of the membrane unit.

6. The method of claim 1, further comprising directing the liquid flow upwards through the membrane unit.

7. The method claim 1, wherein the spacing between the membranes is about 5.0 mm or less.

8. The method of claim 1, wherein the immersed membrane system is part of a membrane bioreactor, and the liquid flow is a return activated sludge flow.

9. The method of claim 1, comprising flowing the liquid flow through a duct.

10. The method of claim 1, wherein the membranes have corrugated faces.

11. An immersed membrane system, comprising:
    a membrane tank having an inlet to receive influent and an outlet;
    a membrane unit within the membrane tank, wherein the membranes have a face-to-face spacing between the membranes of about 6.0 mm or less;
    a pump to provide liquid flow past the surface of the membranes at a cross flow velocity of from about 0.1 m/s to about 2.0 m/s; and an aerator below the membranes, the aerator configured to produce an aeration flow rate of less than about 0.003 scfm/ft$^2$.

12. The system of claim 11, further comprising a recirculation pathway connecting the outlet and the inlet of the membrane tank.

13. The system of claim 12, wherein the recirculation flow rate is from about 1Q to about 10Q.

14. The system of claim 11, wherein the aerator is configured to produce an aeration flow rate of 0 scfm/ft$^2$.

15. The system of claim 11, comprising one or more ducts extending from the inlet to the membrane tank to at least one opening corresponding to the membrane unit.

16. The system of claim 15, wherein the one or more ducts extend horizontally below at least a part of the membrane unit.

17. The system of claim 11, wherein the membrane unit has one or more cassettes of flat sheet membrane elements within a membrane case creating a vertically oriented flow path through the cassette.

18. The system of claim 11, wherein the membrane unit is twice as long as it is wide.

19. The system of claim 11, wherein the spacing between the membranes is about 5.0 mm or less.

20. The system of claim 11, wherein the membranes have corrugated faces.

21. The method of claim 1, comprising aerating the immersed membrane unit at a rate of 0 scfm/ft$^2$.

* * * * *